Aug. 18, 1959  G. A. LYON  2,900,208
WHEEL COVER
Filed Oct. 25, 1954  2 Sheets-Sheet 1
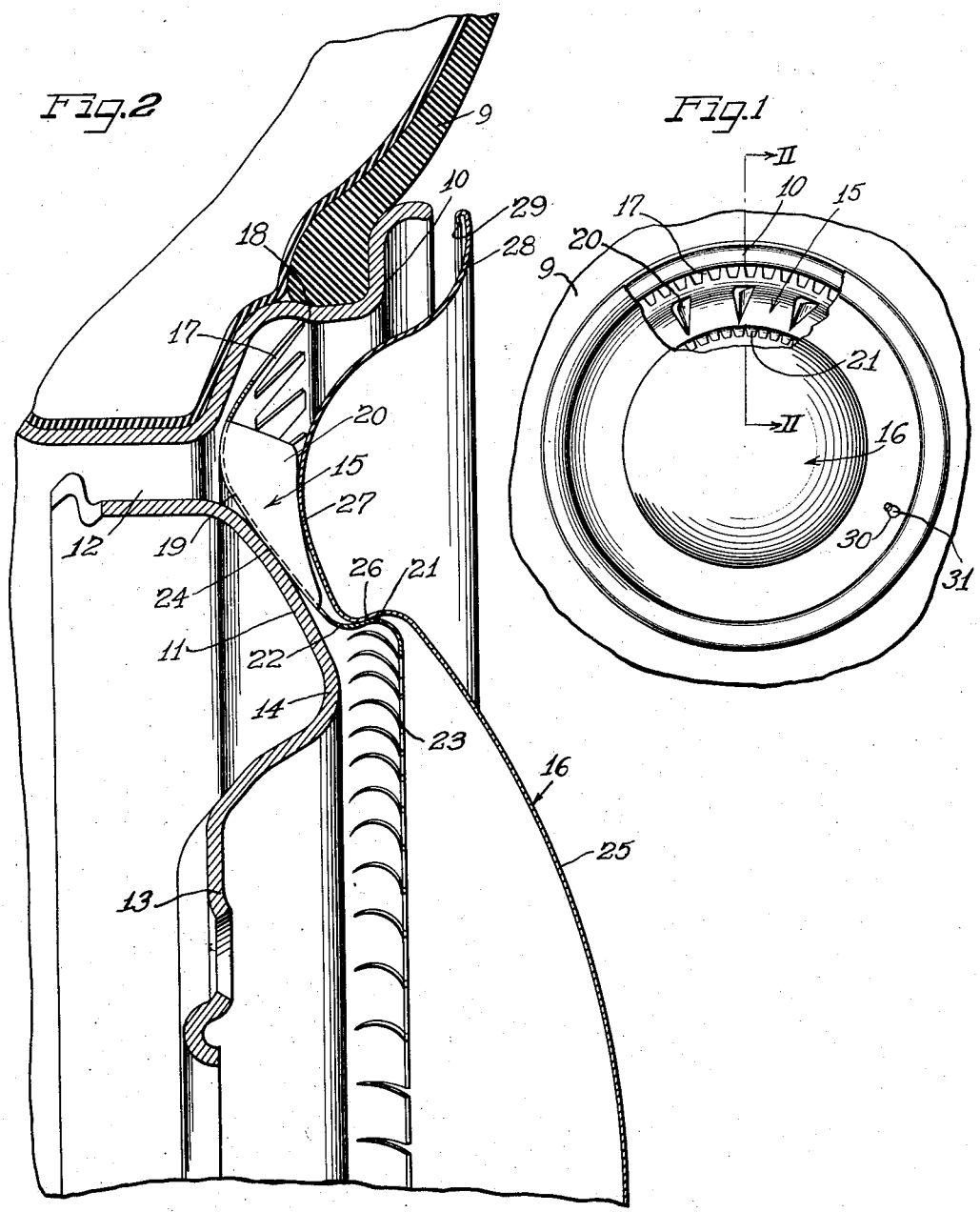
Inventor:
George Albert Lyon
by [signature] Attys

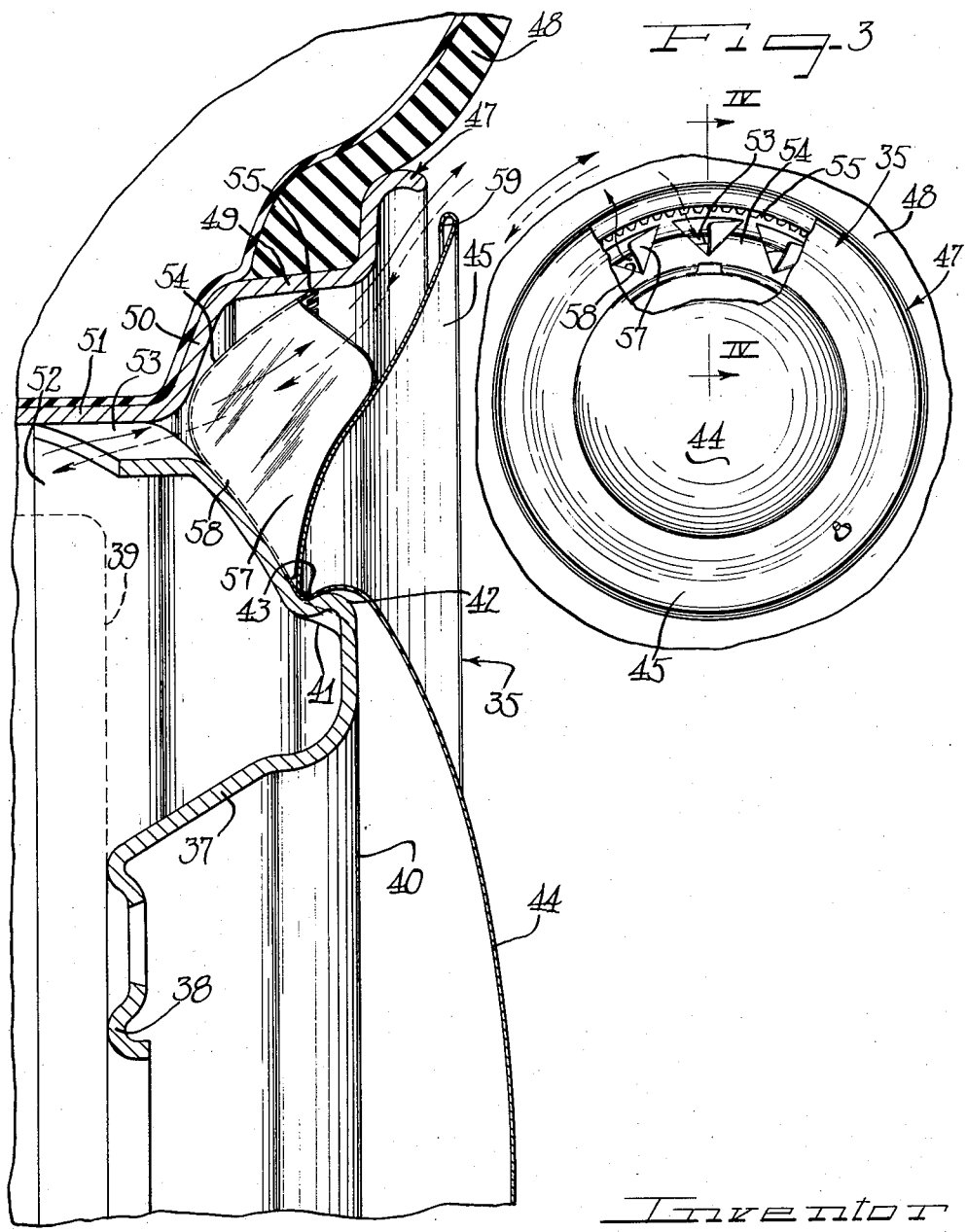

United States Patent Office 2,900,208
Patented Aug. 18, 1959

2,900,208

WHEEL COVER

George Albert Lyon, Detroit, Mich.

Application October 25, 1954, Serial No. 464,563

16 Claims. (Cl. 301—37)

This invention relates to wheel covers and more particularly to an automobile wheel cover provided with wheel cooling means.

The present application is a continuation-in-part of my copending application Serial No. 264,357 filed January 2, 1952, now abandoned.

An important object of the present invention is to provide a wheel structure having in protective, ornamental relation at the outer side thereof a wheel cover assembly provided with novel means for effecting circulation behind the cover and through openings in the wheel.

Another object of this invention is to provide a retaining device which will serve the dual purpose of detachably holding a wheel cover on a wheel and also of assisting in the circulation of air through the wheel behind the cover.

A further object of the invention is to provide a novel wheel cover assembly including a ring member that is cooperative with a cover plate disposed thereover for dividing a space behind the cover into a plurality of air circulation promoting compartments.

Other objects, features and advantages of the present invention will be readily apparent from the following detailed description of certain preferred embodiments thereof taken in conjunction with the accompanying drawings, in which:

Figure 1 is an outer side elevational view of a wheel structure embodying features of the invention and having portions of the cover plate broken away to illustrate the structure therebehind.

Figure 2 is an enlarged fragmentary radial sectional view taken substantially on the line II—II of Figure 1.

Figure 3 is an outer side elevational view of a wheel structure showing a modification of the invention and with portions of a cover plate thereon broken away for illustration of details therebehind; and Figure 4 is an enlarged fragmentary radial sectional view taken substantially on the line IV—IV of Figure 3.

In Figures 1 and 2 the reference character 9 designates generally a conventional pneumatic tire and tube assembly mounted in the usual way upon a conventional multi-flanged drop center type of tire rim 10 carried upon a dished metallic wheel body 11. The body member 11 is attached at spaced intervals to the base flange of the rim and the points of attachment alternate with wheel openings 12 through which air can circulate in a manner well known to those familiar with this art.

In addition, the wheel body member 11 has a central dished bolt-on flange 13 inside of a nose portion 14 by means of which the wheel can be detachably fastened as by means of cap screws or bolts (not shown) to a brake drum or the like (not shown) on a vehicle axle. This wheel structure as described above is conventional on many standard automobiles and hence no further description of the same is believed necessary.

My novel wheel cover assembly as shown in Figures 1 and 2 includes primarily two parts, namely, a retaining ring designated generally by the reference character 15 and an outer decorative wheel cover 16. The retaining ring 15 is of such a construction and diameter as to be disposed generally beyond the nose portion 14 of the body part of the wheel. The outer periphery of this retaining ring 15 is provided with a plurality of radially and axially outwardly inclined retaining fingers 17 for biting engagement with an axial flange of the rim 10 behind a shoulder 18 in the rim flange.

The ring 15 may be made in any suitable manner although I propose to make it out of sheet steel such for example as stainless steel. It lends itself to economical manufacture on a large production scale since it can be formed as a stamping.

An intermediate portion 19 of the ring has punched from it a plurality of integral inclined vanes 20 located behind the cover. These vanes may be of any suitable number and as shown in Figure 1 leave openings in the ring 15 through which air can circulate through the wheel openings 12.

The radially inner edge of the ring 15 is shouldered at 21 and is provided with a plurality of slits or slots 23 for augmenting the resiliency of this annular shouldered portion 21. Actually the shoulder portion 21 is provided with a depressed, re-entrant groove 22 into which a shoulder 26 of the cover 16 is adapted to be snapped as shall be described more fully hereinafter.

It will be noted that the shouldered and slitted portion 21 is disposed adjacent the nose portion 14 of the body part 11.

The wheel cover 16 may be made from a metallic plate or sheet stamping and suitably finished so as to have a highly ornamental appearance such for example as a lustrous finish. It includes a central crown portion 25 terminating in the indented or shouldered portion 26 adapted to snap over the shouldered portion 21 of the retaining ring.

An intermediate portion 27 of this cover is dished inwardly and is adapted to bottom against the edges of the vanes 20 when the cover is retained on the wheel.

The outer peripheral portion of the cover 16 is formed into an annular reinforcing bead 28 having a turned edge 29 which likewise reinforces the cover for the application of a pry-off tool thereto. It will be noted that the turned edge 29 is spaced from the rim flanges 10 so that air can freely circulate behind the cover in the rotation of the wheel.

In addition, the intermediate portion of the cover may be provided with a valve stem opening 30 through which a valve stem 31 (Fig. 1) can project. This valve stem is of a conventional construction and is a part of the tire and tube assembly as is well known in the art. It is, of course, desirable to have its extremity accessible from the outside of the cover so that air may be introduced therein without the necessity of removing the cover from the wheel.

In the application of the cover assembly to the wheel the retaining ring 15 is first placed in the wheel inside the rim and is pressed axially inwardly until it bottoms at 24 on the body part 11 of the wheel. When in this position as shown in Figure 2 the spring fingers 17 of the ring are in biting engagement with the rim flange behind the shoulder 18 so that the ring is tightly held on the wheel. The angle of these fingers 17 is such that any tendency for the ring to become dislodged results in an enhancement of the gripping engagement.

Thereafter the wheel cover 16 is positioned over the wheel with its opening 30 in alignment with the valve stem 31. Upon a pressing of the cover axially toward the wheel its shoulder portion 26 snaps over the slotted resilient shoulder portion 21 of the retaining ring until it is bottomed in the groove 22 as well as against the edges of the radial vanes 20. In this position it is retainingly held on the wheel but can be easily dislodged by the application of a pry-off force to its outer turned edge 29.

It will be noted that the vanes 20 are of a wedge-like shape or, in other words, progressively increase in width radially outwardly. Each of their outer edges is shaped generally to conform with the curvature of the back of the intermediate cover portion 27 so that the cover can seat on these vanes.

Upon rotation of the wheel the vanes 20 assist in the circulation of air through the wheel openings 12 and through the space between the back of the cover and the rim 10.

In the modification of Figures 3 and 4 a cover assembly 35 is applied to the outer side of a vehicle wheel of the general type covered in my Patent 2,445,330 issued July 20, 1948. Such a wheel includes a wheel body 37 having a bolt-on flange 38 adapted to be applied to a vehicle axle structure including a brake drum 39 shown schematically in dash outline. Annularly surrounding the bolt-on flange 38 is an axially outwardly projecting nose bulge 40 having at the radially outer side thereof a shoulder 41 provided with a plurality such as three equidistantly spaced generally radially outwardly projecting cover retaining bumps 40 to which are engageable in press-on, pry-off relation by an annular indented generally radially inwardly projecting intermediate rib-like portion 43 of a cover plate having a central crown portion 44 and an annular outer cover portion 45 which is of a diameter to substantially cover the outer side of a tire rim 47.

Herein the tire rim 47 is of the multi-flange drop center type adapted to support a pneumatic tire and tube assembly 48 or a tubeless tire, as may be preferred. Intermediately the tire rim has a generally axially extending flange 49 which joins a generally radially extending side flange 50 merging with a base flange 51 to which an outer marginal axially extending attachment flange 52 of the wheel body is suitably attached. At appropriate intervals such as four, the flange 52 of the wheel body is inset to provide air circulation openings 53. It will be observed that the shoulder 41 of the wheel body is spaced substantially radially inwardly from the wheel openings 53.

In order to facilitate and improve air circulation through the wheel openings 53, the radially outer cover portion 45 is disposed in assembly in substantial spaced relation to the tire rim 47, and a ring member 54 transversely angular or dished is arranged to fit into the substantial groove defined between the tire rim and the adjacent portion of the wheel body which slopes axially inwardly and radially outwardly from the wheel body shoulder 41. At its outer margin the ring 54 is provided with a series of short generally radially and axially outwardly oblique retaining fingers 55 engageable with the intermediate flange 49 of the tire rim for retaining the ring 54 on the wheel at least to be a sufficient extent to maintain the ring in place when the cover plate is removed. By preference, the ring member 54 conforms as closely as practicable to the tire rim and body portions that it overlies and at its inner portion the ring preferably lies against the wheel body with its inner edge adjacent to the retaining bumps 42. Intermediately and at uniformly circumferentially spaced portions thereof, the ring 54 is provided with struck-out generally axially outwardly projecting and circumferentially obliquely disposed vanes 57 the punching out of which leaves corresponding fairly large openings 58. At their outer edges the vanes 57 are conformed generally to the curvature of the cover portion 45. It will be observed that the cooperation of the vanes 57 with the cover is such that the space between the cover and the ring 54 is divided into a plurality of compartments for which the vanes 57 define angular, air motivating partitions.

By virtue of the large openings 58 in the ring opposite the wheel openings 53, and the angular air moving vanes 57, the air moving quality of which is improved by affording a transverse curvature thereto as well as circumferentially oblique disposition, as best seen in Figure 3, air is aspirated or sucked through the openings 58 and the wheel openings 53 as an incident to clock-wise movement or rotation of the wheel as indicated by the full line directional arrow in Figure 3 and the full line directional arrows in Figure 4. On the other hand, in service rotation of the wheel counter-clockwise as seen in Figure 3 and indicated by the dash line directional arrow, air will be scooped in by the vanes 57 and air moved inwardly behind the cover portion 45 and through the wheel openings 53 as indicated by dash line arrows in Figure 4.

To facilitate and enhance the movement of air behind the cover, the radially outer extremity margin of the cover portion 45 is disposed in substantial spaced relation to the adjacent tire rim flange and is turned under to provide a reinforcing and stiffening finishing bead 59.

In assembling the cover 35 with the wheel, the ring member 54 is first applied by centering it relative to the wheel and pressing it axially inwardly until it bottoms against the wheel body 37 and the retaining fingers 55 make retaining biting engagement with the flange 49 of the tire rim. Then the outer cover plate is assembled by manipulating it into position relative to the retaining bumps 42 and pressing axially inwardly to snap the intermediate indented retaining bead 43 into engagement with the retaining bumps 42. The axially inward camming action of the retaining bumps 42 on the rib 43 forces the adjacent annular area of the cover portion 45 against the outer edges of the vanes 57 and into overlying relation to the adjacent solid inner annular margin of the ring 54. Thereby the ring 54 is positively locked against unintentional displacement from the wheel. Removal of the cover is easily effected by applying pry-off force behind the radially outer cover portion 45. If the ring 54 is to be removed, that can be effected by applying pry-off force behind the retaining fingers 55 by inserting an instrument between the fingers. In both forms of the cover, as best seen in Figures 2 and 4, the generally radially outwardly directed retaining fingers of the respective ring members make such engagement with the tire rim that the rings are held not only against axial displacement from the wheel but also against rotary displacement. Then, since the back surfaces of the respective cover plates engage directly against the tilted edges of the respective vanes 20 and 57, the cover plates are retained against turning on the wheel. This is important in order to avoid distortion of the valve stems that project through the radially outer portions of the covers, as shown.

It will be understood that modifications and variations may be effected without departing from the scope of the novel concepts of the present invention.

I claim as my invention:

1. In a wheel structure including a tire rim and a wheel body with openings through the wheel for air circulation, a cover assembly for disposition at the outer side of the wheel including a ring member and a cover plate member, said ring member being engageable with the wheel over the juncture between the tire rim and the wheel body and over the wheel openings and having a series of openings therethrough with air circulation promoting vanes directed generally axially outwardly and obliquely, said plate cover member being arranged to cover the wheel and said ring member separably in press-on, pry-off relation, one of said members being retainingly engageable with the wheel and having shoulder structure thereon for shouldering firmly in separable relation against the other of said members to retain the same against axial displacement from the wheel in service.

2. In a wheel structure including a tire rim and a wheel body with openings through the wheel for air circulation, a cover assembly for disposition at the outer side of the wheel including a ring member and a cover plate member, said ring member being engageable with the wheel over the juncture between the tire rim and the wheel body and over the wheel openings and having a series of openings therethrough with air circulation promoting vanes directed generally axially outwardly and obliquely, said ring member having retaining fingers engageable with the tire rim and having on the portion thereof that overlies the wheel body shoulder means retainingly engageable with said plate cover member.

3. In a wheel structure including a tire rim and a wheel body with openings through the wheel for air circulation, a cover assembly for disposition at the outer side of the wheel including a ring member and a cover plate member, said ring member being engageable with the wheel over the juncture between the tire rim and the wheel body and over the wheel openings and having a series of openings therethrough with air circulation promoting vanes directed generally axially outwardly and obliquely, said plate cover member being arranged to cover the wheel and said ring member separably in press-on, pry-off relation, one of said members being retainingly engageable with the wheel and having shoulder structure thereon for shoulder firmly in separable relation against the other of said members to retain the same against axial displacement from the wheel in service, said vanes having edges engaging against the inner side of said plate cover member for retaining the members against relative rotation.

4. In a wheel structure including a wheel having a multi-flanged tire rim and a dished wheel body carrying said rim, a cover assembly for the wheel including an outer cover proper and a retaining ring for detachably holding the cover on the wheel, said ring including radially outer spring means for grippingly engaging the tire rim and radially inner shoulder means resiliently yieldable for retaining the cover on the wheel, said cover having an inner annular shoulder of a diameter to be pressed over and into retaining engagement with said ring shoulder means, and said ring having an intermediate portion provided with a plurality of generally radial air circulating vanes disposed between said ring and the rear side of the cover.

5. In a wheel cover structure a circular wheel cover having an intermediate shoulder located between the center of the cover and the periphery of the same and a cover retaining ring for cooperation with the rear side of the cover having resilient means for engaging said shoulder to hold the cover on a wheel and having spaced therefrom means for gripping the wheel to retain the ring on the wheel, a portion of said ring between said two retaining means being formed with radially extending vanes disposed to the rear of the cover for assisting in the circulation of air between the cover and the wheel.

6. In a wheel cover structure, a circular wheel cover having an intermediate inwardly dished annular shoulder located between the center of the cover and the periphery of the same, and a ring for separable cooperation with the inner side of the cover and having spaced therefrom means for gripping the wheel to retain the ring on the wheel, a portion of said ring being formed with axially and radially extending vanes disposed to the axially outer side of the ring and to the axially inner side of the cover for assisting in the circulation of air between the cover and the wheel, each of said vanes progressively increasing in width in a radially outer direction and having a curved generally axially outwardly projecting edge against which the cover can bottom separably when it is held on the wheel.

7. In a wheel structure including a wheel having a multi-flanged tire rim and a dished wheel body carrying said rim, a cover assembly for the wheel including an outer cover proper and a retaining ring for detachably holding the cover on the wheel, said ring including radially outer spring means for grippingly engaging the tire rim and radially inner shoulder means resiliently yieldable for retaining the cover on the wheel, said cover having a central annular shoulder of a diameter to be pressed over and into retaining engagement with said ring shoulder means, and said ring having an intermediate portion provided with a plurality of generally radial air circulating vanes disposed between said ring and the rear side of the cover, said cover having an outer peripheral margin spaced from the tire rim so that air may freely circulate behind said margin.

8. In a wheel structure including a wheel having a multi-flange tire rim, and a dished wheel body carrying said rim, a cover assembly for the wheel including an outer cover proper and a ring member detachably cooperating with the cover on the wheel, said member including radially outer means for grippingly engaging the tire rim and a radially inner portion cooperating with the cover, said cover having an annular shoulder of a diameter to be pressed over and into retaining engagement with shoulder means adjacent said inner portion of the ring member and also including an intermediate portion dished toward the ring member, said ring member having a vaned portion bottomed against the wheel body and formed with vanes projecting axially and radially and against the edges of which said intermediate portion of the cover is bottomed when the cover is retained on the wheel.

9. In a cover assembly for disposition at the outer side of a vehicle wheel, a cover member, and a retaining member therebehind, the retaining member having means thereon for attachment to a wheel and also having means thereon for snap-on, pry-off retaining engagement with the cover member, said retaining member having flange means thereon engageable edgewise against the back of the cover member.

10. In a cover assembly for disposition at the outer side of a vehicle wheel, a cover member, a ring member having at one margin means for retaining engagement with a wheel and at the other margin means engageable by the cover member, said ring having struck out therefrom flange means engageable edgewise against the adjacent back portion of the cover member.

11. In a wheel structure including a wheel having a multi-flanged tire rim and a wheel body carrying said rim, and providing air openings therethrough, a cover assembly for the wheel including an outer cover proper and a ring, said ring including means for gripping the wheel and means spaced therefrom for engagement by the cover, an intermediate portion of the ring between said two means being provided with radially extending vanes for assisting in the circulation of air through the body of the wheel.

12. In a wheel structure including a tire rim and a wheel body with openings therethrough and having cover retaining bumps spaced radially inwardly from said openings, a cover assembly for disposition at the outer side of the wheel including a ring member and a cover plate member, said ring member being engageable with the wheel over the juncture between the tire rim and the wheel body radially outwardly from the bumps and over the wheel openings and having a series of openings therethrough with air circulation promoting vanes directed generally axially outwardly and obliquely, said plate cover member having a turned shoulder retainingly engageable with the bumps in snap-on, pry-off relation and when snapped onto the bumps pressing against said air circulation promoting vanes whereby to press said ring member against the wheel.

13. In wheel structure including a tire rim and a wheel body with wheel openings adjacent juncture of the tire rim and wheel body and with cover retaining bumps on the wheel body, a ring member for disposition between the tire rim and the wheel body over the wheel openings and having a series of air circulation promoting vanes thereon, and a cover member for concealing disposition over said ring member affording a space between the tire rim and the cover member for circulation movement of air therebetween and having retaining shoulder means engageable in snap-on, pry-off relation with said bumps.

14. In a wheel structure including a tire rim and a wheel body having cover retaining bumps thereon and a series of openings adjacent juncture of the wheel body with the tire rim, a cover member for disposition over the outer side of the wheel having shoulder means thereon retainingly engageable in snap-on, pry-off relation with said bumps and overlying the tire rim in spaced relation to enable air circulation therebehind through said openings, and means behind said cover member providing a series of angled air circulation promoting vanes in the space between the cover member and the tire rim to accelerate movement of air through said space and said wheel openings in the rotation of the wheel.

15. In a wheel structure including a tire rim and a wheel body with a valve stem projecting from the tire rim, a cover for disposition at the outer side of the wheel having a valve stem aperture therethrough through which the valve stem registers for access from the outer side of the cover, means for retaining the cover on the wheel in axial position with said valve stem projecting through the valve stem aperture, and a member attached in press-on relation to the wheel and having thereon means projecting away from the wheel engaging the cover for holding the cover against turning on the wheel, whereby to maintain said aperture and said valve stem in alignment and avoiding distortion of the valve stem.

16. In a wheel structure including a tire rim and a wheel body with a valve stem projecting from the tire rim, a cover for disposition at the outer side of the wheel having a valve stem aperture therethrough through which the valve stem registers for access from the outer side of the cover, means for retaining the cover on the wheel in axial position with said valve stem projecting through the valve stem aperture, and an annular member behind the cover retained in non-turning position on the wheel and having projecting therefrom and away from the wheel angled struck out elements engaging a portion of the cover in edgewise engagement and holding the cover against turning relative to the wheel so as to assure that the valve stem will not be distorted.

References Cited in the file of this patent

UNITED STATES PATENTS

| | | |
|---|---|---|
| Re. 19,467 | Lyon | Feb. 12, 1935 |
| 2,102,471 | Lyon | Dec. 14, 1937 |
| 2,306,631 | Lyon | Dec. 29, 1942 |
| 2,405,585 | Lyon | Aug. 13, 1946 |
| 2,569,483 | Lyon | Oct. 2, 1951 |
| 2,633,944 | Butterfield | Apr. 7, 1953 |
| 2,687,192 | Butterfield | Aug. 24, 1954 |

FOREIGN PATENTS

| | | |
|---|---|---|
| 458,464 | Italy | July 18, 1950 |

OTHER REFERENCES

Brake Service, vol. 21, No. 5, page 14, May 1951